US012789444B2

(12) United States Patent
Hidaka et al.

(10) Patent No.: US 12,789,444 B2
(45) Date of Patent: Nov. 10, 2026

(54) MANUFACTURING DEVICE CONTROL METHOD, RESIN CONTAINER MANUFACTURING METHOD, MANUFACTURING DEVICE CONTROL DEVICE AND RESIN CONTAINER MANUFACTURING DEVICE HAVING SAME

(71) Applicant: NISSEI ASB MACHINE CO., LTD., Nagano (JP)

(72) Inventors: Yasuhiro Hidaka, Nagano (JP); Terumasa Okada, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 589 days.

(21) Appl. No.: 18/016,381

(22) PCT Filed: Jul. 16, 2021

(86) PCT No.: PCT/JP2021/026891
§ 371 (c)(1),
(2) Date: Jan. 16, 2023

(87) PCT Pub. No.: WO2022/014716
PCT Pub. Date: Jan. 20, 2022

(65) Prior Publication Data

US 2023/0271374 A1 Aug. 31, 2023

(30) Foreign Application Priority Data

Jul. 17, 2020 (JP) ................................ 2020-123156
Sep. 2, 2020 (JP) ................................ 2020-147627

(51) Int. Cl.
*B29C 49/78* (2006.01)
*B29C 49/06* (2006.01)
*B29L 31/00* (2006.01)

(52) U.S. Cl.
CPC ........... *B29C 49/786* (2013.01); *B29C 49/06* (2013.01); *B29C 49/78* (2013.01);
(Continued)

(58) Field of Classification Search
CPC .... B29C 49/78; B29C 49/06; B29L 2031/712
See application file for complete search history.

(56) References Cited

U.S. PATENT DOCUMENTS

2010/0007060 A1 1/2010 Linke et al.
2014/0145375 A1 5/2014 Feuilloley et al.
(Continued)

FOREIGN PATENT DOCUMENTS

JP 60-34827 A 2/1985
JP 2009-531196 A 9/2009
(Continued)

OTHER PUBLICATIONS

Supplementary European Search Report dated Jul. 12, 2024 in European family member application No. 21842068.5.
(Continued)

*Primary Examiner* — Alison L Hindenlang
*Assistant Examiner* — Shibin Liang
(74) *Attorney, Agent, or Firm* — GREENBLUM & BERNSTEIN, P.L.C.

(57) ABSTRACT

Provided is a control method for a manufacturing device for manufacturing a resin container by blow-molding a preform, the method including: acquiring a target value for the temperature inside a heating device for heating the preform to a temperature that is appropriate for blow-molding; acquiring the actual measured value of the temperature inside the heating device, the temperature having been detected by a sensor disposed inside the heating device; calculating the temperature difference between the target value and the actual measured value; and for adjusting the
(Continued)

heating performance and the cooling performance of the heating device on the basis of the temperature difference.

2 Claims, 11 Drawing Sheets

(52) U.S. Cl.
CPC ................. *B29C 2049/7861* (2022.05); *B29C 2049/78675* (2022.05); *B29L 2031/712* (2013.01)

(56) References Cited

U.S. PATENT DOCUMENTS

| | | | | |
|---|---|---|---|---|
| 2020/0307064 | A1 | 10/2020 | Finger et al. | |
| 2021/0078235 | A1 | 3/2021 | Kitzinger et al. | |
| 2021/0129409 | A1 * | 5/2021 | Kelley | B29C 49/4273 |
| 2021/0187815 | A1 * | 6/2021 | Zimmering | B29C 49/6454 |
| 2021/0339452 | A1 | 11/2021 | Ogihara | |
| 2022/0040900 | A1 | 2/2022 | Hidaka | |

FOREIGN PATENT DOCUMENTS

| | | | | | |
|---|---|---|---|---|---|
| JP | 2014-520015 | A | 8/2014 | | |
| JP | 2017-126121 | A | 7/2017 | | |
| WO | 2019/038441 | | 2/2019 | | |
| WO | 2019-048628 | | 3/2019 | | |
| WO | 2019/101743 | A1 | 5/2019 | | |
| WO | 2020/045451 | A1 | 3/2020 | | |
| WO | 2020/066749 | A1 | 4/2020 | | |
| WO | 2020116358 | * | 6/2020 | | B29C 49/78 |

OTHER PUBLICATIONS

International Search Report issued in International Bureau of WIPO Patent Application No. PCT/JP2021/026891, dated Aug. 31, 2021, along with an English translation thereof.

Written Opinion issued in International Bureau of WIPO Patent Application No. PCT/JP2021/026891, dated Aug. 31, 2021and English translation thereof.

* cited by examiner

MANUFACTURING DEVICE CONTROL METHOD, RESIN CONTAINER MANUFACTURING METHOD, MANUFACTURING DEVICE CONTROL DEVICE AND RESIN CONTAINER MANUFACTURING DEVICE HAVING SAME

TECHNICAL FIELD

The present invention relates to a control method of a manufacturing apparatus, a manufacturing method of a resin container, a control device of a manufacturing apparatus, and a manufacturing apparatus of a resin container having the control device.

BACKGROUND ART

Patent Literature 1 discloses a blow molding machine of a resin container including at least a blow molding part, a heating unit, and a conveyance path for conveying a preform heated in the heating unit to the blow molding part.

CITATION LIST

Patent Literature

Patent Literature 1: WO2020/066749

SUMMARY OF INVENTION

Technical Problem

For a blow molding apparatus configured to manufacture beverage containers and the like that are mass-produced, extremely high productivity and efficiency are required. This kind of blow molding apparatus includes a heating device configured to raise a temperature of the conveyed preform to an optimum blow temperature. The heating device is configured to heat the preform by using near-infrared (light) radiation heat from a near-infrared heater and convective heat of high-temperature air (atmosphere) inside the heating device. If both a heater output and an ambient temperature are not properly adjusted, the preform cannot be heated to the optimum temperature. A preform that is not at the optimum blow temperature is discarded as it is because it cannot be blow-molded into a good container. In addition, although a temperature of the air inside the heating device is raised and adjusted to a predetermined temperature by a heater and a blower, it takes a relatively long time.

Here, when the blow molding apparatus is stopped for some reason, energization to the heating device is also usually stopped. That is, since the air inside the heating device becomes outside the optimum temperature even during temporary stop, in addition to a point of time before start of an operation, it is necessary to raise and adjust the temperature thereof. There is a need for a heating method and a heating device capable of raising a temperature at an early stage, which can reduce an amount of preforms to be uselessly discarded.

The present invention is to provide provides a control method of a manufacturing apparatus, a manufacturing method of a resin container, a control device of a manufacturing apparatus, and a manufacturing apparatus of a resin container having the control device capable of raising a temperature of air or a preform inside a heating device to an optimum temperature at an early stage.

Solution to Problem

A control method of a manufacturing apparatus according to one aspect of the present invention is a control method of a manufacturing apparatus configured to manufacture a resin container by blow-molding a preform. The control method includes: a step of acquiring a target value for a temperature inside a heating device configured to heat the preform to an optimum temperature for blow molding, a step of acquiring an actual measured value of the temperature inside the heating device detected by a sensor arranged inside the heating device, a step of calculating a temperature difference between the target value and the actual measured value, and a step of adjusting a heating performance and a cooling performance of the heating device, based on the temperature difference.

A manufacturing method of a resin container according to one aspect of the present invention is a manufacturing method of a resin container including an injection molding step of injection-molding a bottomed resin preform, and a blow molding step of manufacturing a resin container by blow-molding the preform molded in the injection molding step, in which the above-described control method of a manufacturing apparatus is performed so as to heat the preform molded in the injection molding step to an optimum temperature for blow molding.

A control device of a manufacturing apparatus according to one aspect of the present invention is a control device of a manufacturing apparatus configured to manufacture a resin container by blow-molding a preform, the control device including a target value acquisition unit configured to acquire a target value for a temperature inside a heating device configured to heat the preform to an optimum temperature for blow molding, an actual measured value acquisition unit configured to acquire an actual measured value of the temperature inside the heating device detected by a sensor arranged inside the heating device, a calculation unit configured to calculate a temperature difference between the target value and the actual measured value, and an adjustment unit configured to adjust a heating performance and a cooling performance of the heating device, based on the temperature difference.

A manufacturing apparatus of a resin container according to one aspect of the present invention is a manufacturing apparatus of a resin container including an injection molding part configured to injection-mold a bottomed resin preform, a heating unit including a heating device configured to heat the preform to an optimum temperature for blow molding, a blow molding part configured to manufacture a resin container by blow-molding the preform heated in the heating unit, and the control device of a manufacturing device described above.

Advantageous Effects of Invention

According to the present invention, it is possible to provide the control method of a manufacturing apparatus, the manufacturing method of a resin container, the control device of a manufacturing apparatus, and the manufacturing apparatus of a resin container having the control device capable of raising a temperature of air or a preform inside the heating device to an optimum temperature at an early stage.

DESCRIPTION OF EMBODIMENTS

Figure 1:
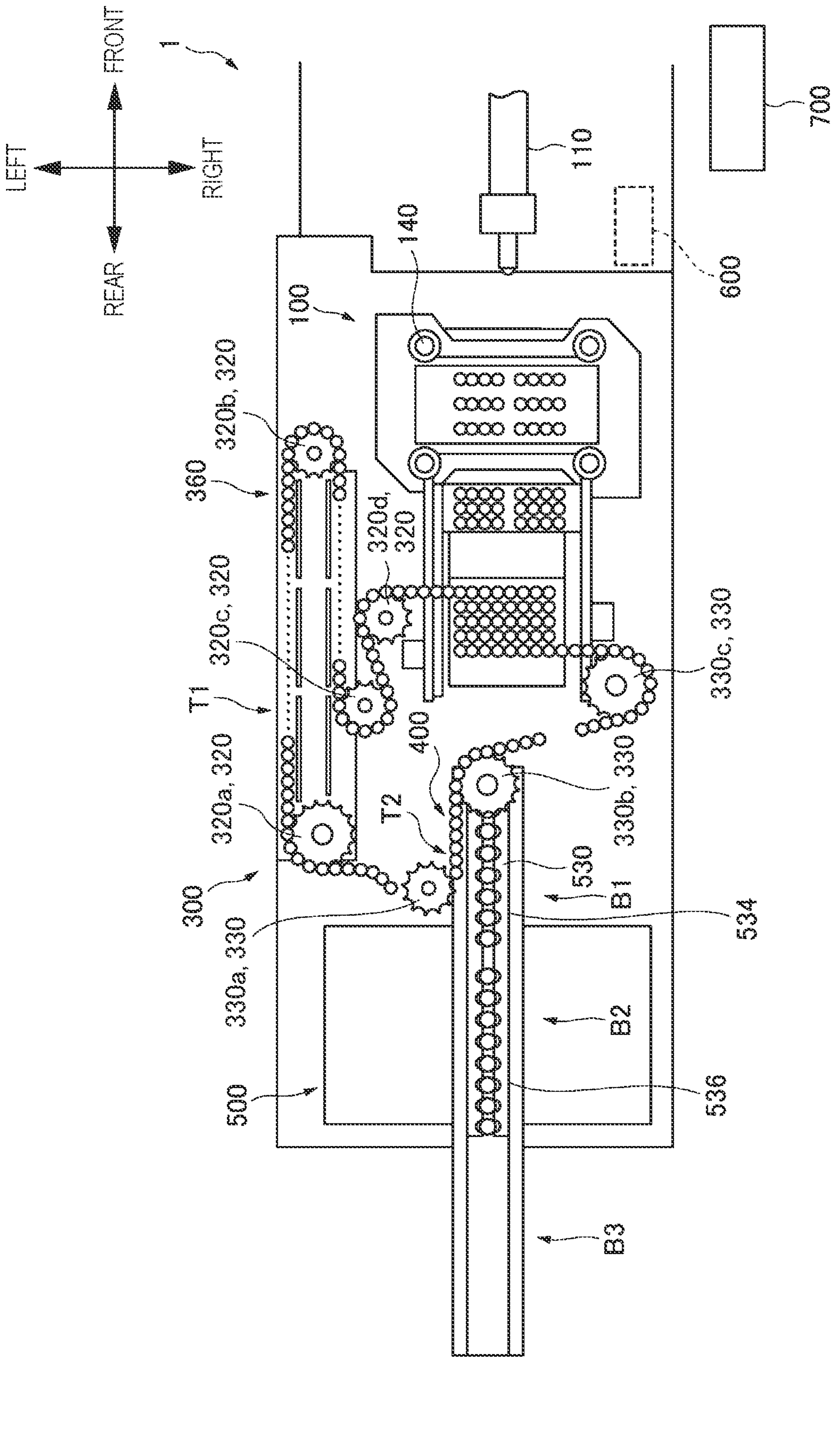
FIG. 1 is a schematic plan view of a blow molding apparatus.

Hereinafter, an embodiment of the present invention will be described with reference to the drawings. Note that, for convenience of description, the dimension of each member shown in the drawings may be different from the dimension of each actual member.

In addition, in the description of the present embodiment, for convenience of description, "left and right direction", "front and rear direction", and "upper and lower direction" are appropriately referred to. These directions are relative directions set with respect to the blow molding apparatus shown in FIGS. 1 and 2. Here, "upper and lower direction" is a direction including "upper direction" and "lower direction". "Front and rear direction" is a direction including "front direction" and "rear direction". The "left and right direction" is a direction including "left direction" and "right direction".

Figure 2:
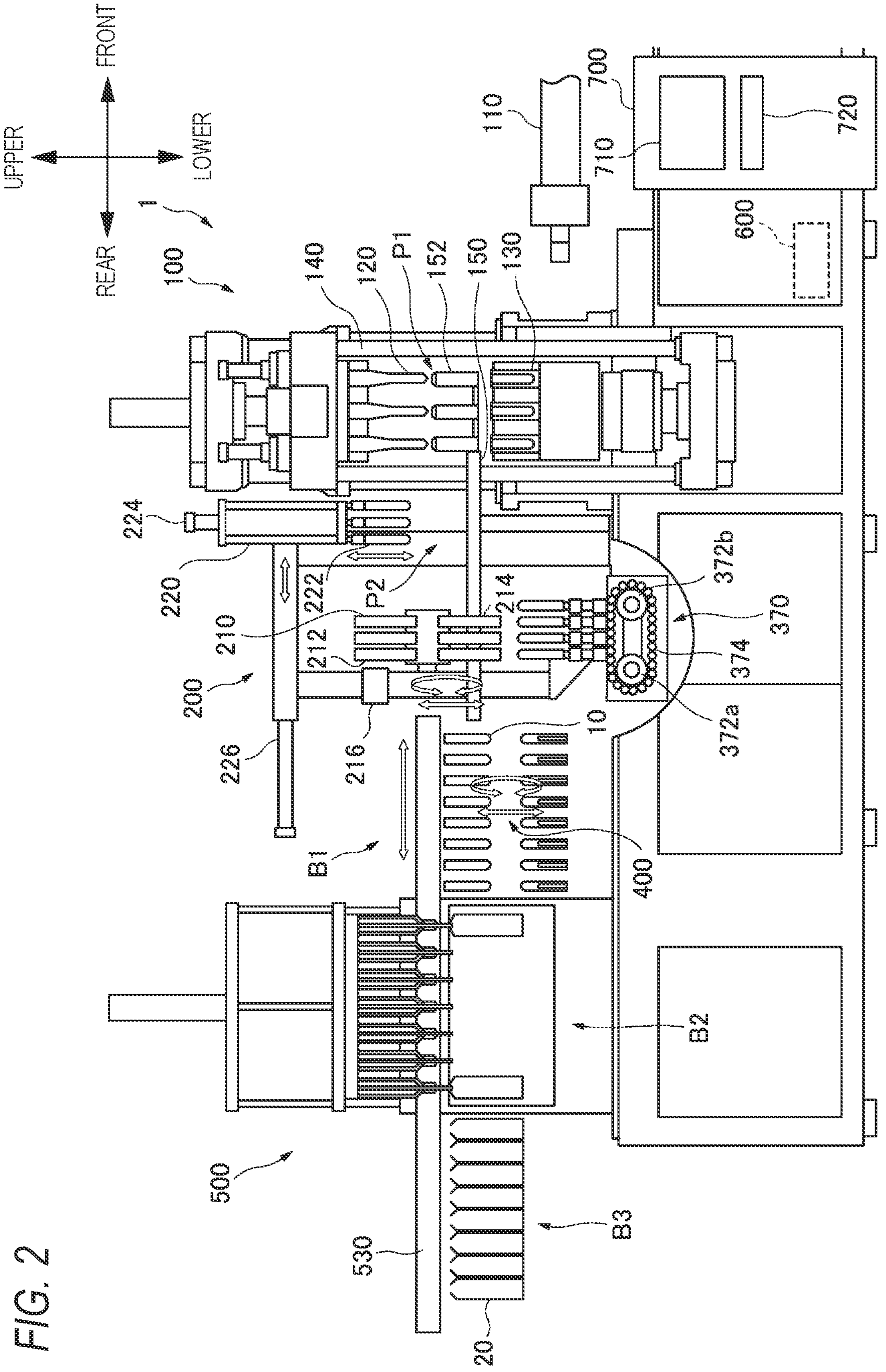
FIG. 2 is a schematic side view of the blow molding apparatus.

FIG. 1 is a schematic plan view showing an overall aspect of a blow molding apparatus 1 of a resin container (an example of a manufacturing apparatus of a resin container) according to an embodiment. FIG. 2 is a schematic side view showing the overall aspect of the blow molding apparatus 1 according to the embodiment. The blow molding apparatus 1 includes an injection molding part 100 configured to mold a resin preform 10, a blow molding part 500 configured to mold a container 20 by blow-molding the preform 10, and a conveyance part 300 configured to convey the preform 10 molded in the injection molding part 100 to the blow molding part 500 (FIG. 1). The blow molding apparatus 1 is a hot parison-type (1.5 stage-type) blow molding apparatus in which N preforms 10 simultaneously injection-molded are blow-molded by M in n times.

The blow molding apparatus 1 includes a take-out device 150 configured to take out the preform 10 from the injection molding part 100, a preform transfer device 220 configured to transfer the preform 10 from the take-out device 150, and a first reversing part (post-cooling part) 200 configured to deliver the preform 10 from the preform transfer device 220 to the conveyance part 300 (FIG. 2). In addition, the blow molding apparatus 1 includes a second reversing part 400 configured to deliver the preform 10 from the conveyance part 300 to the blow molding part 500 (FIG. 2). Further, the blow molding apparatus 1 includes a control device 600 and an input/output device 700 (FIGS. 1 and 2).

The injection molding part 100 is configured to injection-mold N preforms 10 simultaneously by M (M=N/n: M is a natural number) in each of n rows (n is an integer of two or greater) parallel to the left and right direction. The injection molding part 100 includes an injection device 110 configured to inject resin, an injection core mold 120, an injection neck mold (not shown), an injection cavity mold 130, and a mold clamping mechanism configured to drive clamping of molds along four tie bars 140. As shown in FIG. 1, the maximum number N of the preforms that are simultaneously injection-molded in the injection molding part 100 may be, for example, 24 (3 rows×8 preforms). When a diameter of the preform is large, 4 preforms may be arrayed in each row, and therefore, the total number Nis 12 in 3 rows.

The take-out device 150 is configured to take out the N preforms 10 molded in the injection molding part 100. The take-out device 150 is configured to be able to horizontally move N (for example, 3 rows×8) holding members 152 (for example, pots) at a receiving position P1 below the injection core mold 120 and at a delivery position P2 outside a space surrounded by the tie bars 140.

The preform transfer device 220 is configured to transfer the N preforms 10 held in the holding members 152 in three rows of the take-out device 150 located at the delivery position P2 shown in FIG. 2 to the first reversing part 200. The preform transfer device 220 includes a preform holder 222, a first transfer mechanism 224 configured to move the preform holder 222 up and down in the upper and lower direction, and a second transfer mechanism 224 configured to horizontally move the preform holder 222 and the first transfer mechanism 224 in the front and rear direction. As a drive source for the first and second transfer mechanisms 224 and 226, an air cylinder or a servomotor is used, for example.

The first reversing part 200 is a part for post-cooling (additionally cooling) the preform 10, and is configured to reverse the preform 10 in an upright state molded in the injection molding part 100 to an inverted state with a neck portion facing downward, and to deliver the same to the conveyance part 300. The first reversing part 200 includes a first reversing member 210. The first reversing member 210 has N first reversing pots 212 and N second reversing pots 214 provided to face the first reversing pots 212. The first reversing pot 212 and the second reversing pot 214 (first reversing member 210) are configured to be intermittently reversible by 180° around an axis. The first reversing member 210 is configured to be able to move up and down by a ball screw or the like that is driven by a drive source 216 (for example, a servomotor).

Figure 3:
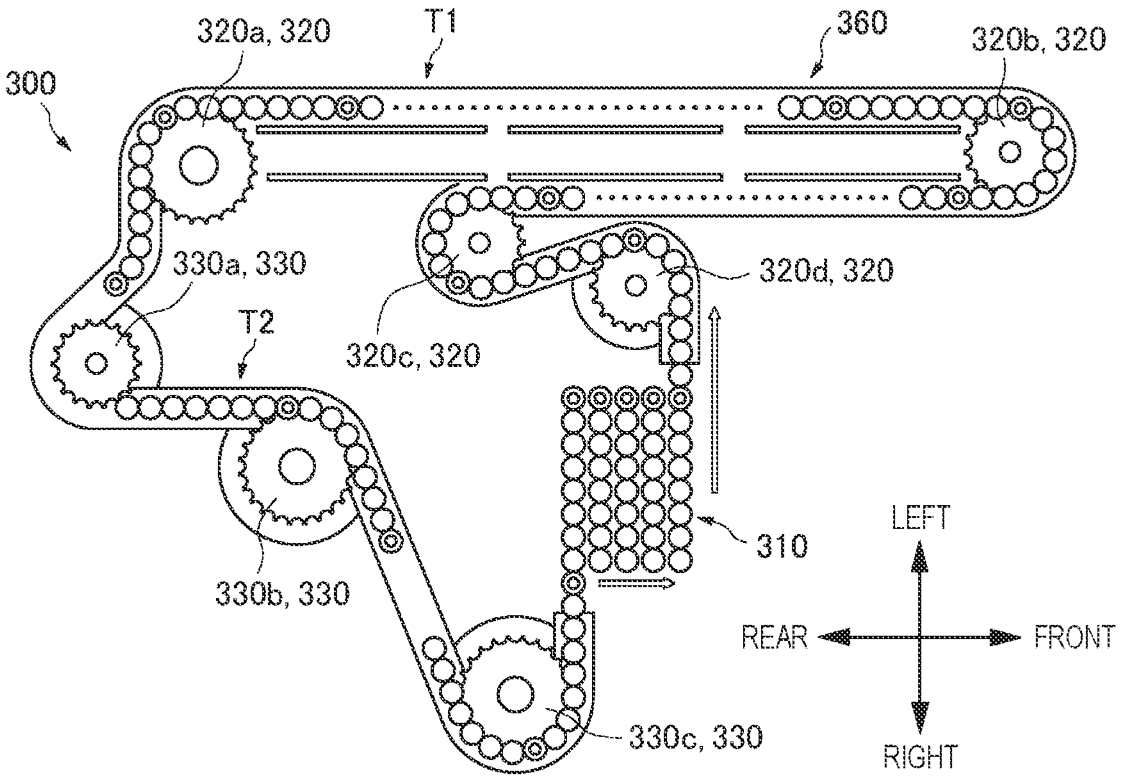
FIG. 3 is a plan view of a conveyance part.

The conveyance part 300 is configured to convey, to the blow molding part 500, the preform 10 conveyed from the injection molding part 100 to the conveyance part 300 via the first reversing part 200. FIG. 3 is a plan view showing an aspect of the conveyance part 300. The conveyance part 300 includes a plurality of first conveyance members 310 configured to support the preforms 10. The M first conveyance members 310 are connected by a connecting member to form one set of the first conveyance members 310. The connecting member of one set of the first conveyance members 310 is configured to be driven by a first conveyance driving unit 320 and a second conveyance driving unit 330, which will be described later. In FIG. 3, a position of the leading first conveyance member 310 (or the preform 10) of one set of the first conveyance members 310 is marked with a double circle so as to distinguish the same with the other seven ones other than the leading one. Each of the first conveyance members 310 is configured to be rotatable around an axis. Note that, an aspect in which the first conveyance members 310 are not connected is also possible. In this case, each of the first conveyance members 310 is provided with a member that engages with a continuous/intermittent drive member such as a sprocket.

The conveyance part 300 has a loop-shaped conveyance path composed of a guide rail or the like, and is configured to convey the first conveyance members 310 in a circulation manner along the conveyance path. The conveyance part 300 includes a plurality of sprockets 320*a*, 320*b*, 320*c* and 320*d* serving as a first conveyance driving unit 320 configured to continuously drive the first conveyance members 310, and sprockets 330*a*, 330*b* and 330*c* serving as a second conveyance driving unit 330 configured to intermittently drive the first conveyance members 310. In the first conveyance driving unit 320, the sprocket 320*d*, the sprocket 320*c*, the sprocket 320*b*, and the sprocket 320*a* are arranged in corresponding order from an upstream side. In the second conveyance driving unit 330, the sprocket 330*a*, the sprocket 330*b*, and the sprocket 330*c* are arranged in corresponding order from the upstream side.

A region in which the first conveyance members 310 are continuously driven by the first conveyance driving unit 320 is a continuous conveyance region T1, and a region in which the first conveyance members 310 are intermittently driven by the second conveyance driving unit 330 is an intermittent conveyance region T2. The continuous conveyance region T1 is located on a further upstream side of the conveyance part 300 than the intermittent conveyance region T2. A heating unit 360 configured to heat a temperature of the preform 10 to a temperature suitable for blow molding is provided in the continuous conveyance region T1. The heating unit 360 is arranged on a path spanning the sprocket 320*c*, the sprocket 320*b*, and the sprocket 320*a* in the continuous conveyance region T1. The heating unit 360 may be configured by arranging a heating device, which includes heaters, for example, quartz heaters and flat plate-shaped reflectors arranged at intervals in a conveyance direction and in multiple stages in a height direction (upper and lower direction), so as to surround the conveyance part 300 in the continuous conveyance region T1. Inside the heating unit 360, a blower is configured to blow wind from a back side of the heater.

In addition, the conveyance part 300 includes a parallel driving device 370 arranged at a position below the first reversing part 200 and configured to drive one set of (n+1) or more (for example, four (four rows) first conveyance members 310 in parallel (FIG. 2). The parallel driving device 370 is configured by attaching both ends of a plurality of conveying rails to two chains 374 spanning two sprockets 372*a* and 372*b* at end portions in the front and rear direction. When one of the sprockets 372*a* and 372*b* is rotated by one step, the conveyance rails are transferred by one step. The leading row of one set of the first conveyance members 310 arranged in the parallel driving device 370 is configured to be pushed out leftward by a carry-out device (not shown) including, for example, an air cylinder or the like. Thereby, one set of the first conveyance members 310 on which the preforms 10 are placed are continuously conveyed by being sequentially engaged with the sprocket 320*d* that is continuously driven. The parallel driving device 370 is configured to transfer another set of the first conveyance members 310 forward by one step after conveying one set of the first conveyance members 310 leftward. The rearmost row of the parallel driving device 370 is configured to receive one set of the first conveyance members 310 on which the preforms 10 delivered from the sprocket 330*c* are not placed.

The leading first conveyance member 310 of the leading row of one set of the first conveyance members 310 is carried out by the carry-out device and engaged with the most upstream sprocket 320*d*, so that a continuous conveyance force is applied from the sprocket 320*d* to one set of the first conveyance members 310. When a drive force is applied to each set of the first conveyance members 310 that engage with the four continuously driven sprockets 320*a*, 320*b*, 320*c* and 320*d* existing in the continuous conveyance region T1, another set of the first conveyance members 310 that do not engage with the continuously driven sprocket on the upstream side thereof are pushed, and therefore, the plurality of sets of first conveyance members 310 are continuously conveyed along the conveyance direction in the continuous conveyance region T1.

The second reversing part 400 is arranged between the sprocket 330*a* and the sprocket 330*b* in the intermittent conveyance region T2 of the conveyance part 300 (FIGS. 1 and 2). The second reversing part 400 includes a second reversing member (not shown) configured to reverse the preform 10 conveyed to the position of the second reversing part 400 by the conveyance part 300 from an inverted state to an upright state. One set of the first conveyance members 310 are intermittently driven by the second conveyance driving unit 330 so that one set of the first conveyance members 310 are stopped for a predetermined time at the position of the second reversing part 400.

The blow molding part 500 is configured to mold the resin containers 20 by stretching M preforms 10 with blowing air. The blow molding part 500 includes a blow cavity mold that is a split mold, is openable and closable in the left and right direction and defines a shape of a body portion of the container 20, a liftable bottom mold that defines a bottom portion of the container 20, and a second conveyance member 530 for conveying the preform 10 and the container 20 in the front and rear direction. In addition to these, the blow molding part 500 may include a stretch rod, a blow core mold, a neck mold, and the like. In the case of having a stretch rod, the resin container 20 is molded by biaxially stretching the preform by using a blowing air and a vertical-axis driving of the stretch rod.

The second conveyance member 530 is a chuck member configured to grip neck portions of M preforms 10 or containers 20 and to convey the same intermittently. The second conveyance member 530 includes holding arms configured to grip the neck portions of the preforms 10 or containers 20. The second conveyance member 530 integrally includes a carry-in unit 534 and a carry-out unit 536, and is configured to reciprocally drive in the front and rear direction. The reciprocating drive is realized by, for example, a servomotor. The reciprocating drive reciprocates the carry-in unit 534 between a preform receiving position B1 and a blow molding position B2 and reciprocates the carry-out unit 536 between the blow molding position B2 and a take-out position B3. The holding arms are configured to be integrally driven to be opened and closed in the left and right direction by a drive force of an air cylinder, for example. In addition, a row pitch (distance between the respective preforms) of the respective holding arms of the carry-in unit 534 is configured to be changeable from a narrow pitch at the preform receiving position B1 to a wide pitch at the blow molding position B2 when moving from the preform receiving position B1 to the blow molding position B2.

Figure 4:
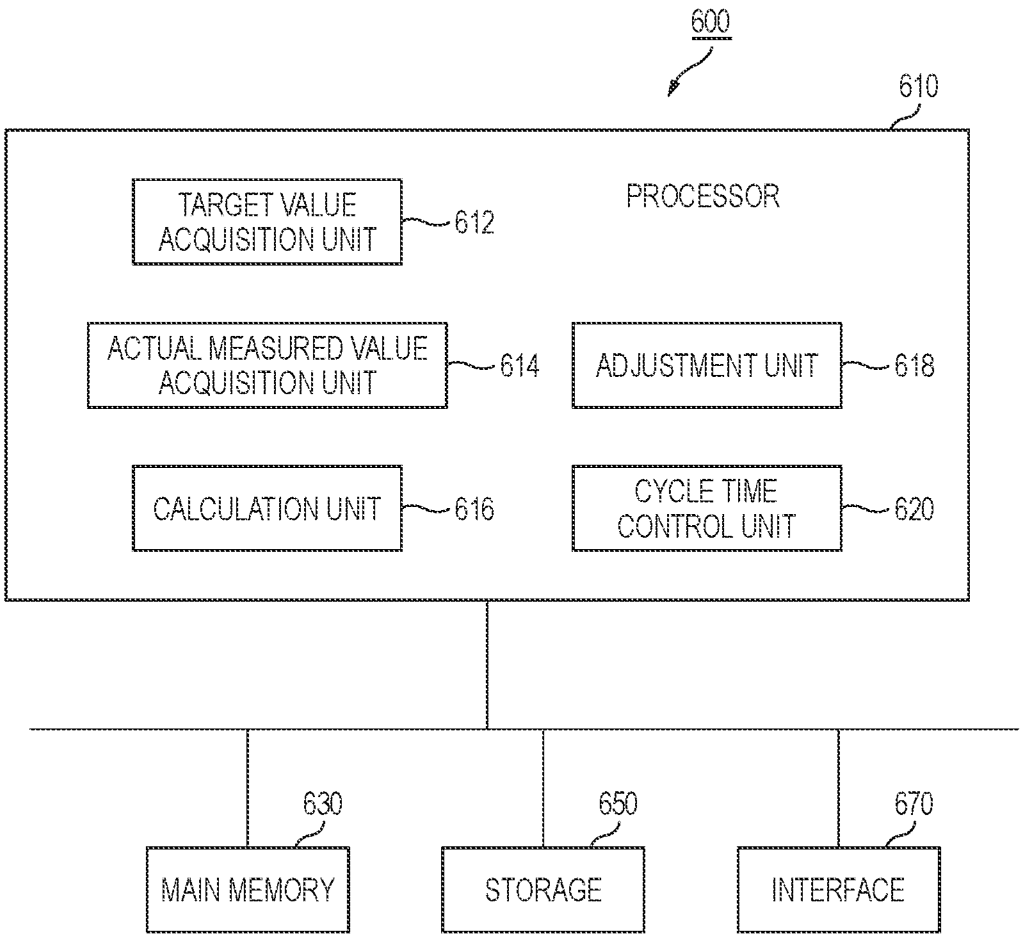
FIG. 4 is a block diagram of a control device.

The control device 600 is a device configured to control the blow molding apparatus 1. FIG. 4 is a block diagram showing a configuration of the control device 600 according to the present embodiment. The control device 600 includes a processor 610, a main memory 630, a storage 650, and an interface 670. A program for controlling the blow molding apparatus 1 is stored in the storage 650. Examples of the storage 650 include a hard disk drive (HDD), a solid state drive (SSD), a non-volatile memory, and the like. The processor 610 is configured to read a program from the storage 650, to develop the same into the main memory 630, and to execute processing in accordance with the program. In addition, the processor 610 is configured to secure a storage area in the main memory 630 or the storage 650 in according with the program. The processor 610 is configured to function as a target value acquisition unit 612, an actual measured value acquisition unit 614, a calculation unit 616, an adjustment unit 618, and a cycle time control unit 620 by executing the program.

The target value acquisition unit 612 is configured to acquire a target value for a temperature inside the heating device of the heating unit 360 configured to heat the preform 10 to an optimum temperature for blow molding. The target value may be an input value from an input unit 720 of an input/output device 700, which will be described later, or may be a target value stored in advance in the storage 650.

The actual measured value acquisition unit 614 is configured to acquire an actual measured value of a temperature inside the heating device detected from a sensor arranged inside the heating device of the heating unit 360. The calculation unit 616 is configured to calculate a temperature difference between the target value acquired by the target value acquisition unit 612 and the actual measured value acquired by the actual measured value acquisition unit 614.

The adjustment unit 618 is configured to adjust a heating performance and a cooling performance of the heating device, based on the temperature difference calculated by the calculation unit 616. For example, the heating performance refers to an output of a heater, and the cooling performance refers to an output of a blower. In the case in which the heating device of the heating unit 360 is provided in a plurality of divided predetermined regions, the adjustment unit 618 may be configured to function as a division adjustment unit that adjusts a heating performance and a cooling performance of each predetermined region. As the predetermined regions, for example, a region between the sprocket 320*c* and the sprocket 320*b* may be set as Zone 1, a region between the sprocket 320*b* and the sprocket 320*a* may be trisected, and two parts on an upstream side of the trisected parts may be set as Zone 2, and the remainder may be set as Zone 3 (refer to FIG. 5 to be described later). A temperature sensor may be provided in each of the predetermined regions. However, the adjustment of the heating performance and cooling performance of each predetermined region may be performed based on an actual measured value of a temperature of one predetermined region.

The cycle time control unit 620 is configured to control the injection molding part 100 of the blow molding apparatus 1 to extend an injection molding cycle time for the preform 10 in the injection molding part 100 until a temperature inside the heating unit reaches a target value.

The input/output device 700 includes a display unit 710 and an input unit 720. The input unit 720 includes an input device such as a button, a keyboard, and the like for inputting a control instruction to the blow molding apparatus 1. The display unit 710 includes a display device such as a display for outputting operation information about the blow molding apparatus 1.

Figure 5:
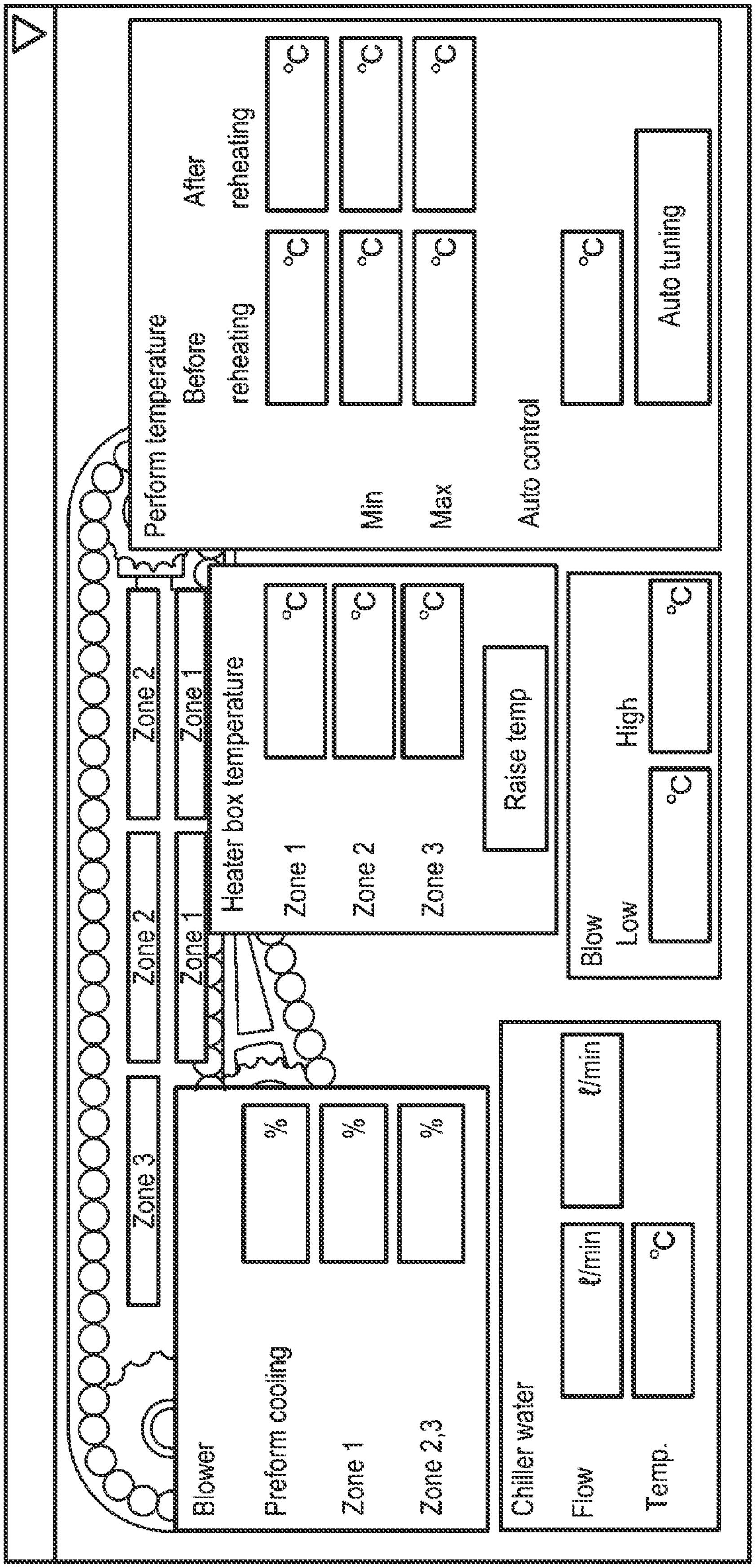
FIG. 5 shows an example of an aspect in which a display unit displays elements of an operating state of the blow molding apparatus.

FIG. 5 shows an example of an aspect in which the display unit 710 displays elements of an operating state of the blow molding apparatus 1. Specifically, FIG. 5 is an example of a screen for collectively confirming and setting information about an ambient temperature inside the heating device and a heating condition of the preform 10.

In FIG. 5, the actual measured values of air temperatures (ambient temperatures) in each predetermined region (Zone 1, Zone 2, Zone 3) inside the heating device are displayed in "Heater box temperature". The actual measured value of the temperature (surface temperature) of the preform 10 is displayed in "Preform temperature". Among them, the actual measured value of temperature before heating is displayed in "Before reheating", and the actual measured value of temperature after heating is displayed in "After reheating", and the maximum and minimum values of these values are displayed in "Max" and "Min", respectively. A setting value for a temperature of the preform 10 that enables blow molding is displayed in "Blow", a setting value for the minimum temperature is displayed in "Low", and a setting value for the maximum temperature is displayed in "High". The values indicated in "Blow" may be set by an operator's input.

Setting values for outputs of a plurality of blowers that circulate an outside air inside the heating device are displayed in "Blower", in which a setting value for an output of a blower for cooling the preform (particularly, the neck portion) is displayed in "Preform cooling" and setting values for outputs of blowers for adjusting a temperature of air (atmosphere) inside the heating device are displayed in "Zone 1" and "Zone 2, 3", respectively. The values indicated in "Blower" may be set by an operator's input. Note that, the setting of "Blower" shown in FIG. 5 becomes invalid when performing temperature adjustment shown in FIG. 6, which will be described later. In addition, a setting value for a flow rate of refrigerant that is supplied to prevent overheating of the heating device is displayed in a range on the right side of "Flow" of "Chiller water", and an actual measured value thereof is displayed in a range on the left side of "Flow". The setting value for the flow rate of the refrigerant displayed in the range on the right side of "Flow" may be set by an operator's input. In addition, an actual measured value of a temperature of the refrigerant is displayed in "Temp.".

Figure 6:
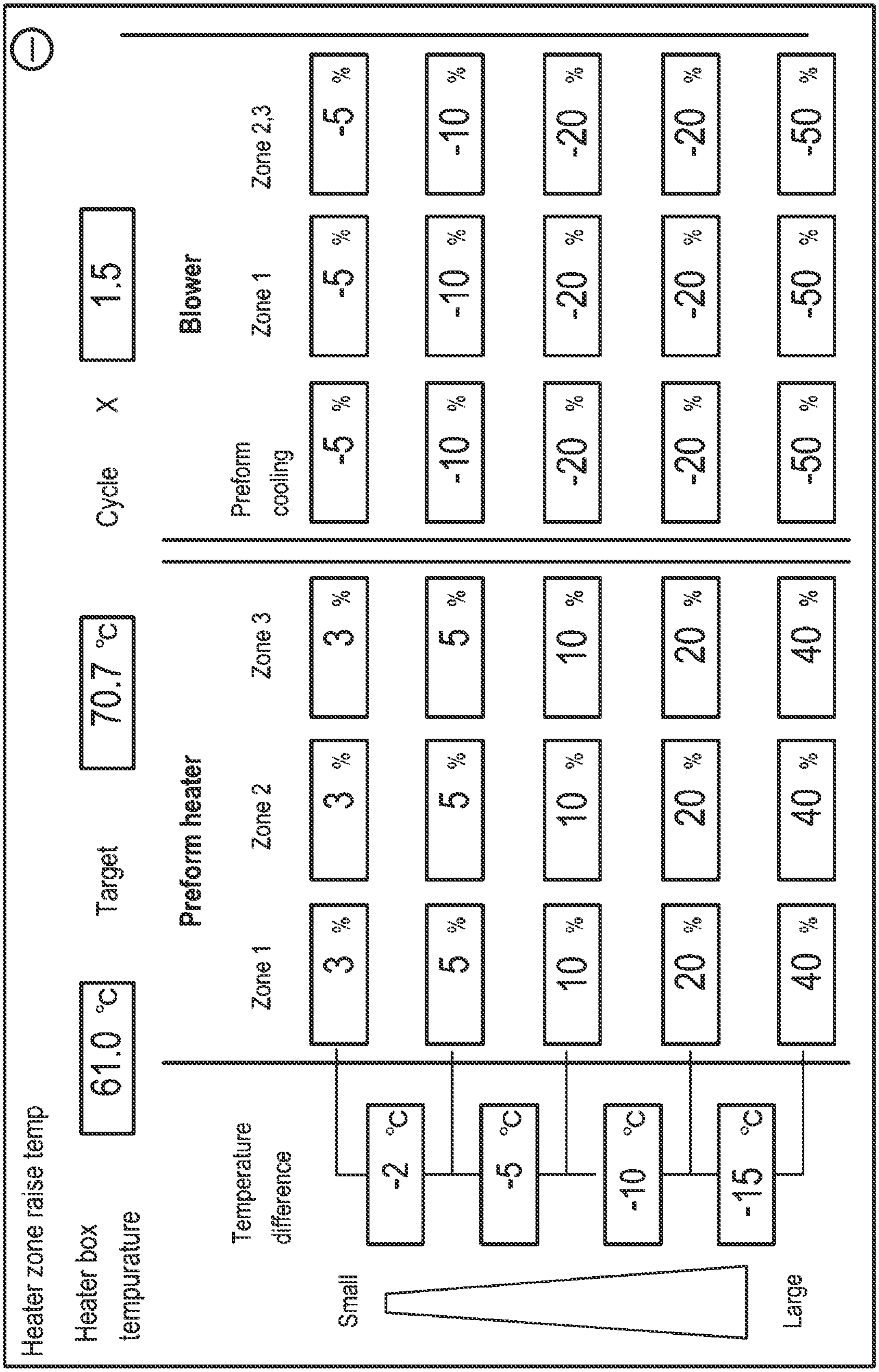
FIG. 6 shows an example of an aspect in which the display unit displays a target value and an actual measured value of a temperature inside a heating device.

FIG. 6 shows an example of an aspect in which the display unit 710 displays a target value and an actual measured value of a temperature inside a heating device. Specifically, FIG. 6 is an example of a screen for enabling the ambient temperature inside the heating device to be raised and adjusted to a target value at an early stage. In FIG. 6, an aspect is shown in which a difference between a target value and an actual measured value of an ambient temperature at which automatic temperature-raising control of the heating device is started is set and outputs of the heater and the blower are set corresponding to the difference.

In FIG. 6, the actual measured value of the ambient temperature of one predetermined region is displayed in "Heater box temperature". In FIG. 6, the target value for the ambient temperature of one predetermined region is displayed in "Target". At least one setting value (four in FIG. 6) for the temperature difference between the target value and the actual measured value of the ambient temperature at which automatic temperature-raising control (automatic temperature adjustment control) is started is displayed in "Temperature difference". The setting value for the temperature difference may be set by an operator's input.

In addition, in FIG. 6, degrees of adjustment of the heating performance and the cooling performance corresponding to the temperature difference between the target value and the actual measured value, i.e., the setting values for the outputs of the heater and the blower are displayed in "Preform Heater" and "Blower", respectively. The setting values for the outputs of the heater and the blower may be set by an operator's input. When changing the degrees of adjustment of the heating performance and the cooling performance for each temperature difference, a plurality of temperature differences are set, and the output values of the heater and the blower are set for each temperature difference. The output values of the heater and the blower in the automatic temperature-raising control may be set for each of the predetermined regions with different positions inside the heating device (for the heater, at least three locations of "Zone 1", "Zone 2" and "Zone 3", and for the blower, at least three locations of "Preform cooling", "Zone 1" and "Zone 2, 3"). In addition, in FIG. 6, a degree of extension of the injection molding cycle time for the preform 10 in the injection molding part 100 is displayed in "Cycle".

According to the adjustment shown in FIG. 6, for example, when the actual measured value is lower than the target value by 9° C. (−9° C.), the output of the heater is increased by 10% from a setting value for molding (an output value of the heater set for actual molding, not shown), and the output of the blower is lowered by 20% from a setting value for molding (an output value of the blower set for actual molding, not shown). Next, when the temperature is raised, and therefore, the actual measured value becomes lower than the target value by 4° C. (−4° C.), for example, the output of the heater is increased by 5% from the setting value for molding, and the output of the blower is lowered by 10% from the setting value for molding. The above control is repeated, so that the actual measured value approaches the target value. In this way, since the outputs of the heater and the blower are adjusted stepwise and automatically in response to the actual measured values, the ambient temperature can be brought close to the target value early and automatically without burden on the operator. Note that, the setting values for the heater and the blower may be increase-decrease rates with respect to the setting value for molding or actual output values. In FIG. 6, for the setting values for the heater and the blower, increase-decrease rates with respect to the setting value for molding are set.

Note that, the settings of the output of the heater and the output of the blower in each predetermined region may not be uniform, and may be different in each predetermined region. For example, the present invention is not limited to the aspect of changing the output for each of "Zone 1", "Zone 2" and "Zone 3", and an output of a part (for example, the lowest heater) of the heaters arranged in a multi-stage shape in the height direction (upper and lower direction) may be configured to be settable independently of the outputs of the other heaters (for example, a separate display/setting screen of "Preform Heater" for the lowest heater may be provided). Thereby, the output of the lowest heater disposed closest to the reflective plate can be independently controlled and used for early temperature-raising of the reflective plate, and a temperature-raising rate of the ambient temperature can be increased by heat dissipation to the reflective plate.

In addition, the settings of the output of the heater and the output of the blower in each predetermined region may be continuously changed by feedback control, in response to the actual measured values. In particular, the outputs are preferably controlled by attenuation curves that change steplessly in response to the actual measured values. Further, since the difference between the actual measured value and target value of the ambient temperature is large at a start period, the heater and the blower may be output uniformly (output of the heater: large, output of the blower: small) based on the setting values, and at a transitional period and at an end period in which the actual measured value is close to the target value, the output of the heater and the output of the blower may be changed stepwise or continuously by feedback control, in response to the actual measured values. In particular, the outputs are preferably controlled by attenuation curves that change steplessly in response to the actual measured values. The temperature at the time of switching the control may be separately set on the screen or may be incorporated into the program. This makes it possible to raise the temperature of the air (atmosphere) inside the heating device earlier and appropriately. Note that, after the ambient temperature reaches the target value, the output of the heater or blower is adjusted based on predetermined heating conditions at the time of molding (heating conditions at the time of actually blow-molding preforms) set separately.

Figure 7:
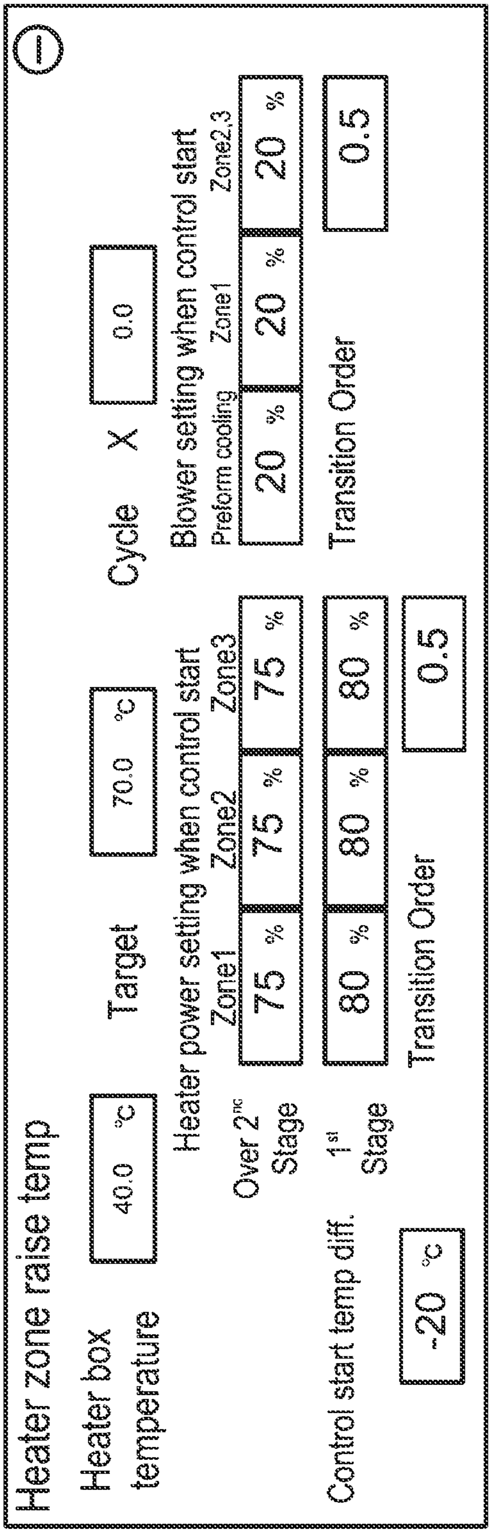
FIG. 7 shows another example of the aspect in which the display unit displays the target value and the actual measured value of the temperature inside the heating device.

FIG. 7 shows another example of the aspect in which the display unit 710 displays a target value and an actual measured value of a temperature inside the heating device. In FIG. 7, the actual measured value of the ambient temperature in one predetermined region is displayed in "Heater box temperature". In FIG. 7, the target value for the ambient temperature in one predetermined region is displayed in "Target". A setting value for a temperature difference between a target value and an actual measured value of an ambient temperature for switching automatic temperature-raising control (automatic temperature adjustment control) is displayed in "Control start temp diff.". The setting values for the target value for the ambient temperature and the temperature difference may be set by an operator's input.

In FIG. 7, the outputs of the heater and the blower in an initial state are each displayed in "Heater power setting when control start" and "Blower setting when control start". The outputs of the heater and the blower in the initial state may be set by an operator's input. In the example shown in FIG. 7, the outputs of the heater and the blower are controlled from a point of time when the temperature difference between the target value and actual measured value of the ambient temperature becomes equal to or less than the setting value for switching the automatic temperature-raising control, based on attenuation curves (nth order curves, etc.) that change steplessly in response to the actual measured values. The attenuation curves are calculated from predetermined exponential functions incorporated into the program. While the temperature difference between the target value and actual measured value of the ambient temperature exceeds the setting value for switching the automatic temperature-raising control, the heater and the blower adjust the ambient temperature with the outputs (constant outputs) in the initial state. Control transition orders (orders) for predetermined exponential functions that calculate attenuation curves in the control of the outputs of the heater and the blower are each displayed in "Transition order". A setting value for the control transition order may be set by an operator's input. In addition, the output of the heater in the initial state is displayed on "1$^{st}$ Stage" column for the first stage (lowest heater) of heaters arranged in a multi-stage shape in the height direction (upper and lower direction) and is displayed on "Over 2$^{nd}$ Stage" column for the second stage or higher (heaters over the first stage). Note that, in columns of "Heater power setting when control start" and "Blower setting when control start", from the left in the drawing, the heaters correspond to three locations of "Zone 1", "Zone 2" and "Zone 3", and the blowers correspond to three locations of "Preform cooling", "Zone 1" and "Zone 2, 3". Note that, the setting values for the outputs of the heater and the blower in the initial state may be increase-decrease rates with respect to the setting value for molding or actual output values. In the example of FIG. 7, the setting values for the heater and the blower setting values are actual output values.

According to the adjustment shown in FIG. 7, the operation of the heating device is controlled such that the outputs of the heater and the blower are initially made constant (setting values: outputs in the initial state) (the outputs of the heaters are changed at the first stage and at the second stage or higher), and when the difference becomes within a certain range (within 20° C. in the example of FIG. 7), the output values are changed in a curve shape and finally become the output values at the time of actual molding. In this way, the outputs of the heater and the blower are switched in response to the actual measured values, and the outputs of the heater and the blower are continuously adjusted based on the attenuation curves from a point of time when the temperature difference between the target value and actual measured value of the ambient temperature becomes equal to or less than the setting value for switching the automatic temperature-raising control. Therefore, the ambient temperature can be brought close to the target value early and automatically without burden on the operator.

Hereinafter, a manufacturing method of a resin container by the blow molding apparatus 1 including the control device 600 according to the present embodiment will be described. A manufacturing method of a resin container includes a step of injection-molding a preform 10 in the injection molding part 100, a step of conveying the preform 10 molded in the injection molding part 100 to the blow molding part 500, a step of heating the preform 10 while conveying the preform 10 to the blow molding part 500, and a step of blow-molding the conveyed preform 10 into a container 20 in the blow molding part 500.

The step of injection-molding the preform 10 is a step of molding N preforms by injecting molten resin into a space formed by mold clamping the injection core mold 120, the injection neck mold, and the injection cavity mold 130 of the injection molding part 100 (FIG. 2).

The step of conveying the preform 10 molded in the injection molding part 100 to the blow molding part 500 includes a first conveyance step, a first transfer step, a second conveyance step, and a second transfer step. The first conveyance step is a step of taking out the preform 10 from the injection molding part 100 by the take-out device 150 and further transferring the preform from the take-out device 150 to the first reversing part 200 by the preform transfer device 220 (FIG. 2). The first transfer step is a step of reversing the preform 10 from the upright state to the inverted state by the first reversing part 200 and transferring the same to the conveyance part 300 (FIG. 2).

The second conveyance step is a step of conveying the preform 10 to the second reversing part 400 in the conveyance part 300 (FIG. 1). In the second conveyance step, the leading row of one set of the first conveyance members 310 of the parallel driving device 370 are conveyed leftward by the carry-out device, and the preforms 10 are conveyed to the second reversing part 400 via the continuous conveyance region T1 and the intermittent conveyance region T2 (FIGS. 1 and 2).

The second transfer step is a step of reversing the preform 10 from the inverted state to the upright state by the second reversing part 400 and transferring the same to the second conveyance member 530 of the blow molding part 500 (FIG. 2). However, when the temperature-raising of the heating device of the heating unit 360 has not been completed, the preform 10 is not transferred to the blow molding part 500, and the preform 10 is removed from the first conveyance member 310 in the sprocket 330*c*. The first conveyance member 310 on which the preform 10 is not placed is delivered to the parallel driving device 370 by the sprocket 330*c* (FIGS. 1 and 2).

The step of heating the preform 10 is a step of heating the preform 10 to an optimum temperature for blow molding during conveyance by the heating device of the heating unit 360 provided in the continuous conveyance region T1 of the conveyance part 300.

The step of blow-molding the preform 10 into the container 20 is a step of conveying the preform 10 from the preform receiving position B1 to the blow molding position B2 by the second conveyance member 530, mold-clamping the blow cavity mold and the bottom mold, and blowing the air into the preform 10 to mold the container 20. Through these steps, the container 20 is manufactured.

Figure 8:
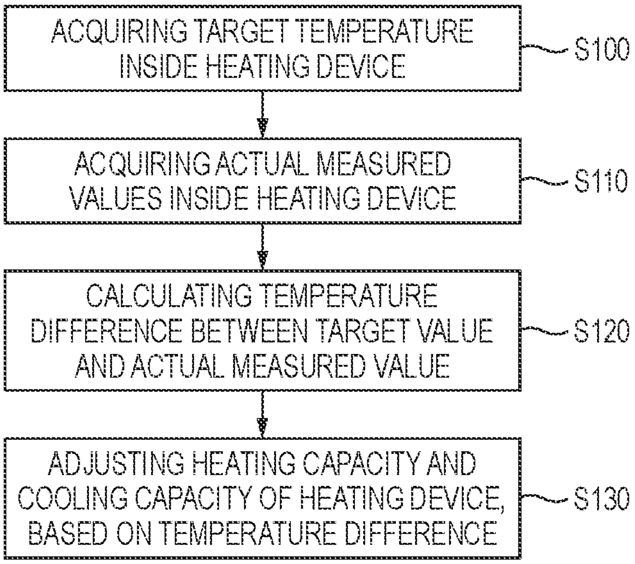
FIG. 8 shows an example of a flow of a control method.

FIG. 8 shows an example of a flow of a control method of the blow molding apparatus 1. As shown in FIG. 8, a control method of the blow molding apparatus 1 includes a step (step S100) of acquiring, by the target value acquisition unit 612, a target value for a temperature inside the heating device, a step (step S110) of acquiring, by the actual measured value acquisition unit 614, an actual measured value of the temperature inside the heating device, a step (step S120) of calculating, by the calculation unit 616, a temperature difference between the target value and the actual measured value, and a step (step S130) of adjusting, by the adjustment unit 618, a heating performance and a cooling performance of the heating device, based on the temperature difference. In addition, the control method may include a step of adjusting, by the adjustment unit 618 functioning as a division adjustment unit, a heating performance and a cooling performance of each predetermined region in a plurality of divided predetermined regions (Zone 1, Zone 2, and Zone 3) of the heating device. Further, the control method may include a step of extending, by the cycle time control unit 620, a cycle time in the injection molding part 100 until the temperature inside the heating device reaches the target value. For example, the molding cycle may be extended in such an aspect that, when 1.5 is input to the item of "Cycle" displayed by the display unit 710 in FIG. 6, the molding cycle is extended to 1.5 times of a default cycle during temperature-raising. In addition, the extension of the molding cycle may be set to be automatically released when the atmosphere reaches the target value.

In the meantime, for example, in a blow molding machine including an injection device, a safety door is opened when a predetermined operation such as a purge process is performed at the start or restart of an operation. When the safety door is opened, the blow molding apparatus or the heating device is stopped. After the operation is finished, the operation is started/restarted, but the air inside the heating device is outside the optimum temperature, and therefore, is temperature-raised and adjusted. The time required to raise and adjust the temperature of the air or the like inside the heating device to a temperature suitable for blow molding is about several tens of minutes when it is long. Since preforms that have been injection-molded and conveyed during this period cannot be heated to the optimum blow temperature, they should be discarded (if the injection device is stopped, additional time is required until restarting). In addition, an amount of preforms to be discarded increases for a high-productivity blow molding apparatus (for example, 1.5 step machine). In general, in order to mass-produce containers with stable quality, it is necessary to similarly heat preforms under predetermined heating condition so that the preforms always have the same temperature distribution. A range of the predetermined heating condition is usually narrow, and a temperature of a structure (frame, reflective plate, etc.) constituting the heating device also has an effect. Therefore, in order to temperature-raise and adjust the heating device again so that the predetermined heating condition can be implemented, it is necessary to appropriately raise the temperature of the structure of the heating device and to adjust the ambient temperature again to fall within a predetermined range.

The control method of the blow molding apparatus 1 of the above embodiment monitors the temperature of the air (atmosphere) inside the heating device, compares the target value for the ambient temperature with the actual measured value, and changes the heating capability (output of the heater) and cooling performance (output of the blower) of the heating device in each case, in response to the temperature difference. When the temperature difference is large (for example, −10° C.: the actual measured value is lower than the target value by 10° C.), the heating performance is increased and the cooling performance is lowered, and when the temperature difference is small (for example, −2° C.), the heating performance is lowered and the cooling performance is increased. Thereby, the temperature of the atmosphere can be raised and adjusted to the target value at an early stage (the temperature of the heating device can be raised at an early stage), and therefore, the preform 10 can be heated to the optimum blow temperature at an early stage. This makes it possible to reduce an amount of preforms to be discarded.

In addition, the control method of the blow molding apparatus 1 of the embodiment can optimally adjust the heating and cooling capacities by setting the heating performance increase rate (heater output increase rate) and the cooling performance decrease rate (blower output decrease rate) corresponding to the temperature difference for each of the predetermined regions (Zone 1, Zone 2, Zone 3, etc.) of the heating device.

Further, the control method of the blow molding apparatus 1 of the embodiment can delay the conveyance of the preform 10 in the blow molding apparatus 1 by appropriately extending the molding cycle during the raising/adjustment of the temperature of the atmosphere. In addition, injection molding may be performed one time in a plurality of default cycles, and as a result, the cycle time may be extended. This makes it possible to further reduce an amount of preforms to be discarded.

Figure 9:
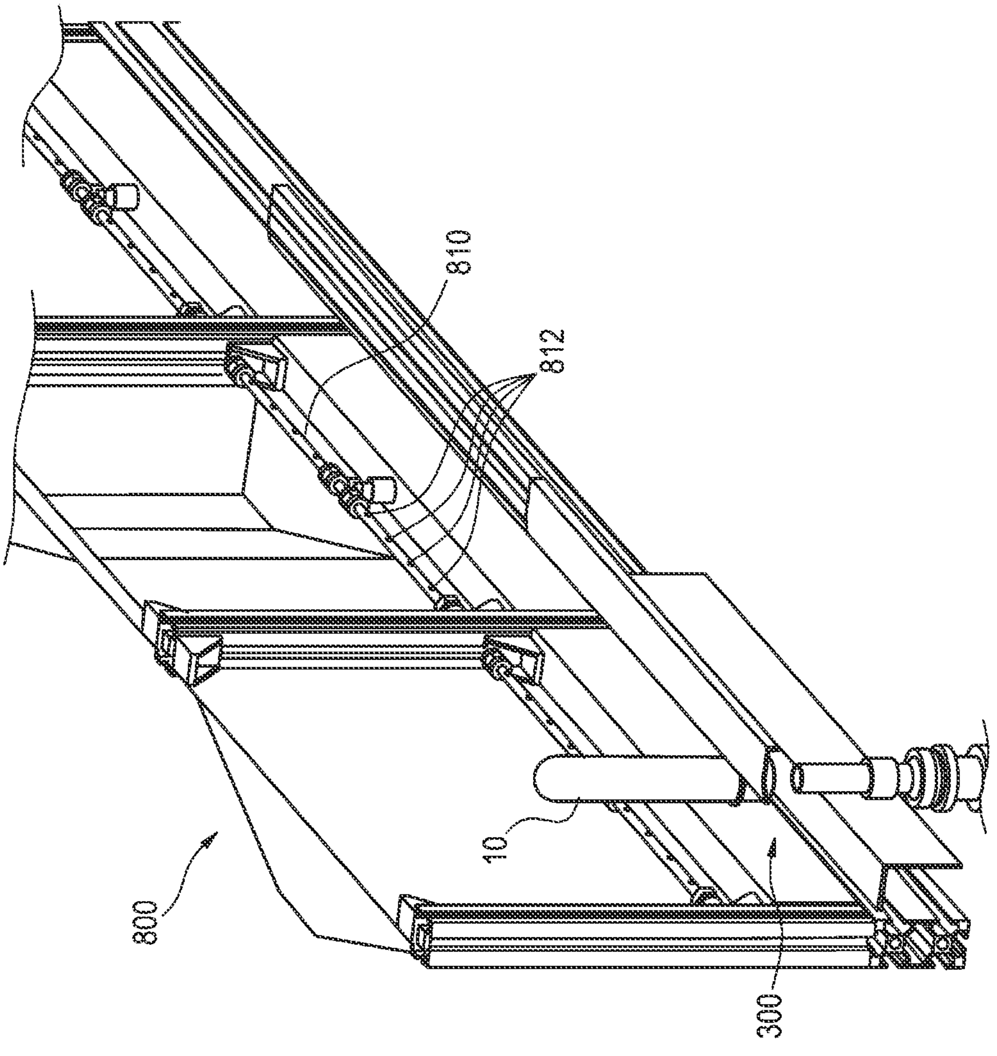
FIG. 9 shows an inside aspect of a heater box provided for a heating unit of a specific aspect.
Figure 10:
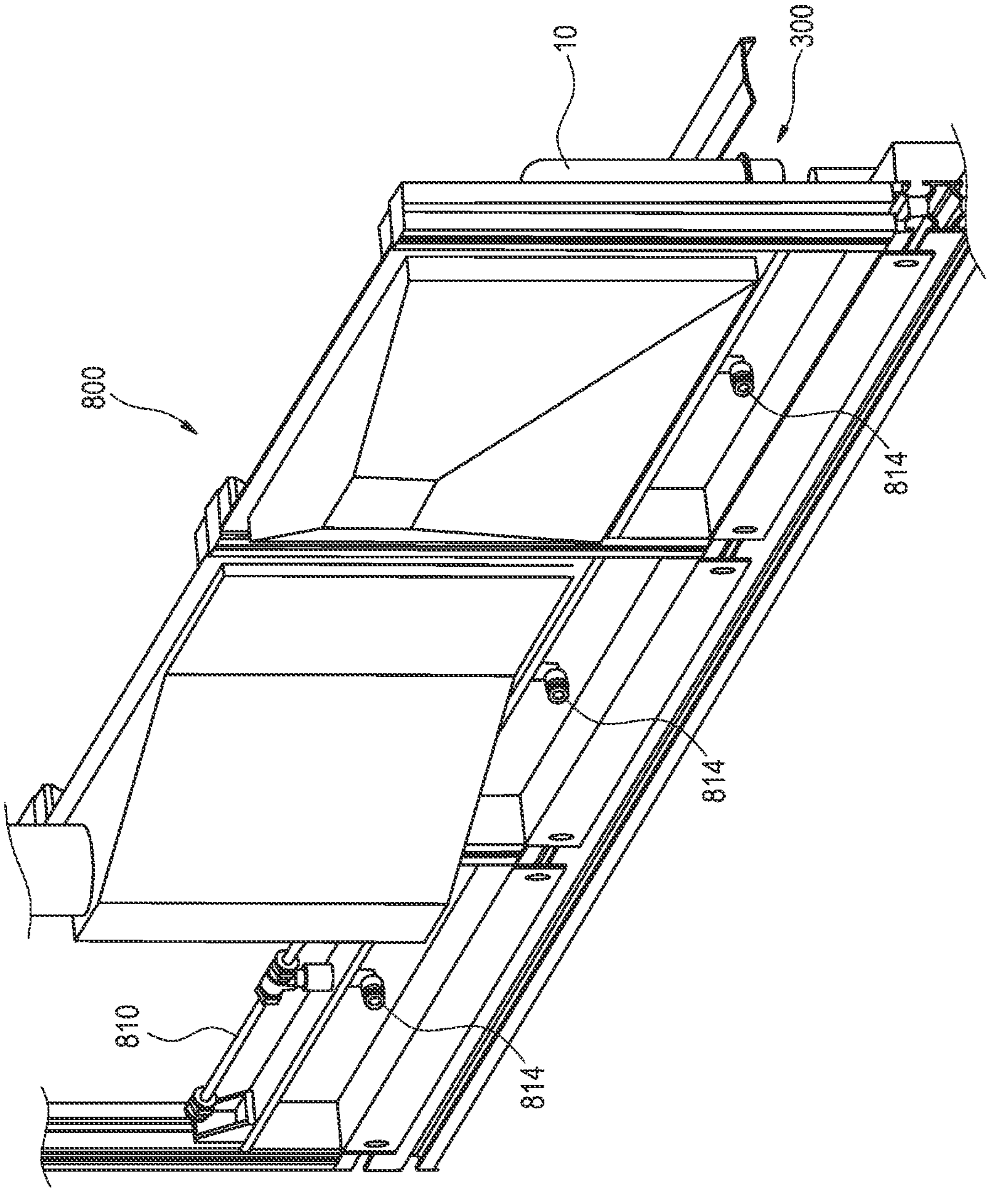
FIG. 10 shows an external aspect of the heater box provided for the heating unit of the specific aspect.
Figure 11:
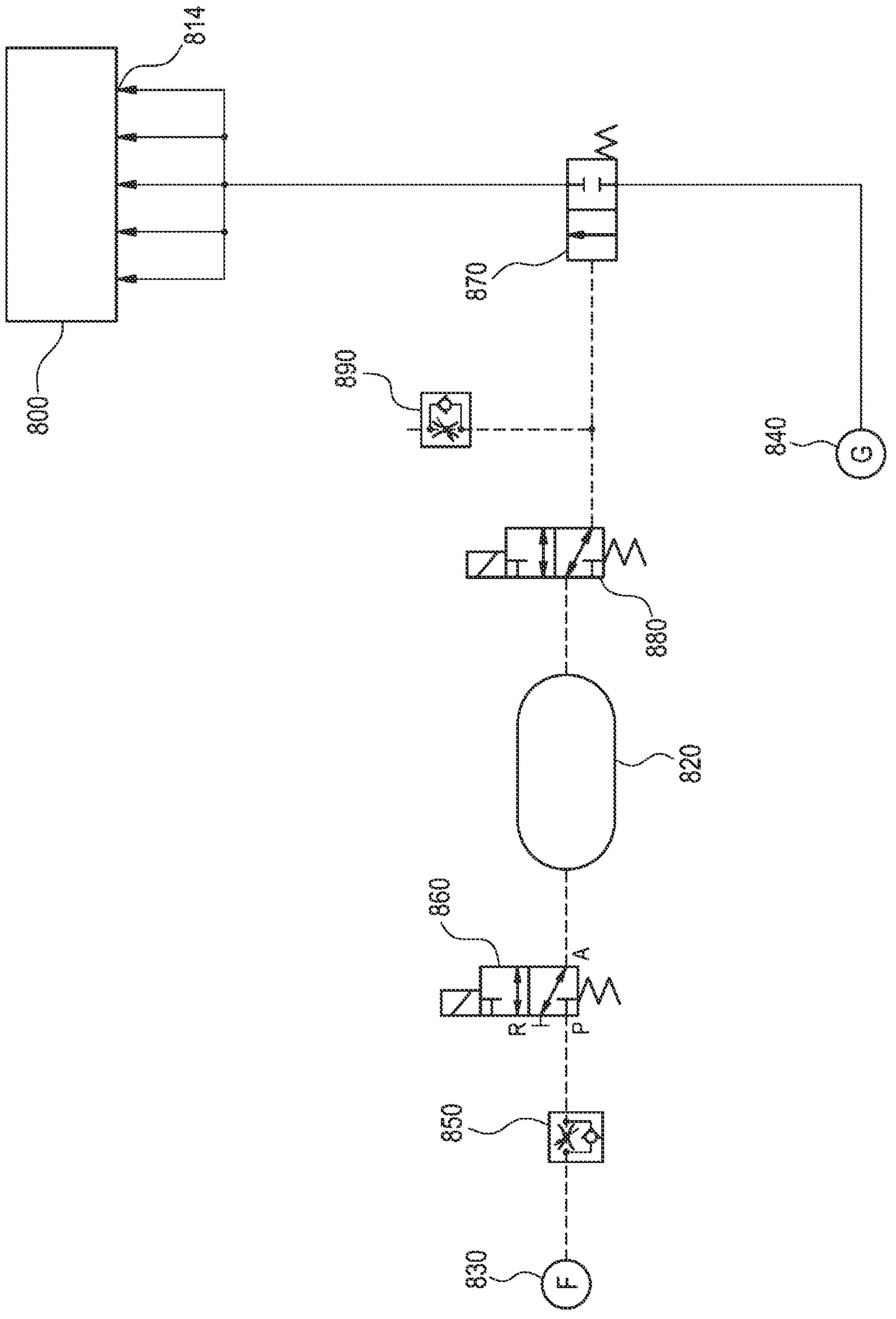
FIG. 11 shows a conduit line for introducing air for cooling into the heater box.

Here, a heating device cooling mechanism (cooling device for the heating device) of the heating unit 360 of the blow molding apparatus 1 according to a specific aspect will be described with reference to FIGS. 9, 10 and 11. FIG. 9 shows an internal aspect of a heater box 800 provided for the heating unit 360 of a specific aspect. FIG. 10 shows an external aspect of the heater box 800 provided for the heating unit 360 of the specific aspect. FIG. 11 shows a conduit line for introducing air for cooling into the heater box 800.

The heater box 800 has a heating device on an inner side thereof. The heating device includes, for example, a quartz heater (heating element, heating lamp) and a reflector (reflective plate). In this example, the quartz heater and the reflector are provided so as to sandwich the preform 10 conveyed along the conveyance part 300 (the quartz heater and the reflector are not shown in FIGS. 9 and 10).

The heater box 800 is provided with a pipe 810 for supplying air for cooling for cooling the reflector, separately from the blower described above. The pipe 810 has a plurality of ejection ports 812 for ejecting air for cooling toward the inner side of the heater box 800. The ejection ports 812 are provided at substantially equal intervals throughout the pipe 810. The ejection ports 812 are arranged behind the reflector (not shown). The reflector is cooled from a back side by the air for cooling ejected from the ejection ports 812. The pipe 810 has a plurality of connecting portions 814 for connecting a piping for introducing air for cooling, on an outer side of the heater box 800. In FIG. 10, three connecting portions 814 are shown, and are provided to correspond to each of trisected regions of the heater box 800. At least the same number of connecting portions 814 as the divided regions of the heater box 800 are provided on the outer side of the heater box 800.

In a conduit line (pneumatic circuit) shown in FIG. 11, the heater box 800, an accumulator 820, a first air pressure source 830, and a second air pressure source 840 are shown. The accumulator 820 is connected to the first air pressure source 830 via a first flow rate control valve 850 and a first electromagnetic valve 860, and is configured to store pressurized gas (pressurized gas, compressed air) supplied from the first air pressure source 830. The first electromagnetic valve 860 is a normally closed solenoid valve. Thereby, when the first electromagnetic valve 860 is energized, the accumulator 820 operates to open, so that pressurized air is supplied from the first air pressure source 830 and stored therein, and when the first electromagnetic valve 860 is not energized, the accumulator automatically operates to close, so that the stored air is not exhausted to the first air pressure source 830 side (pressurized air is not supplied to the accumulator 820 in the event of a power failure). Note that, the first air pressure source 830 and the second air pressure source 840 supply gas pressurized at, for example, 1.2 to 2.0 MPa to the conduit line. In addition, the accumulator 820 stores, for example, 0.2 to 0.5 L of pressurized gas.

The heater box 800 is connected to the second air pressure source 840 via a pilot-operated valve (third electromagnetic valve) 870. Specifically, piping is made such that air for cooling (pressurized gas) is supplied from the second air pressure source 840 to each connecting portion 814 of the pipe 810 provided for the heater box 800.

The pilot-operated valve 870 is a normally closed valve. The pilot-operated valve 870 is connected to the accumulator 820 via the second electromagnetic valve 880. A piping extending from the second electromagnetic valve 880 to the pilot-operated valve 870 is branched into two, one of which is connected to the pilot-operated valve 870 and the other is connected to the second flow rate control valve 890. Note that, the second flow rate control valve 890 may be provided in some midpoint of the piping extending from the second electromagnetic valve 880 toward the pilot-operated valve 870. The second electromagnetic valve 880 is a normally open solenoid valve. Thereby, when the second electromagnetic valve 880 is not energized, the accumulator 820 automatically operates to open to supply air to the pilot-operated valve 870, and when the second electromagnetic valve 880 is energized, the accumulator operates to close not to supply air to the pilot-operated valve 870. The second flow rate control valve 890 is configured to control a flow rate of air that is supplied from the accumulator 820 to the pilot-operated valve 870.

When air is supplied from the accumulator 820 to the pilot-operated valve 870, the pilot-operated valve 870 opens, so that air for cooling is introduced from the second air pressure source 840 to the heater box 800 and the air for cooling is ejected from the ejection ports 812 in the heater box 800 to the back side of the reflector. This cools the reflector.

The cooling mechanism described above is particularly effective in the event of a power failure. In the below, an operation of the cooling mechanism in the event of a power failure will be described. First, the first electromagnetic valve 860 is opened to store pressurized gas of a predetermined performance in the accumulator 820 in advance at the time of energization (after the storing ends, the first electromagnetic valve 860 may be closed).

When the blow molding apparatus 1 is not energized due to a power failure, the first electromagnetic valve 860 is automatically closed and the second electromagnetic valve 880 is automatically opened. Thereby, the air stored in the accumulator 820 is supplied to the pilot-operated valve 870, so that the pilot-operated valve 870 is automatically switched from the closed state to the open state. Thereby, the pressurized gas of the second air pressure source 840 is automatically supplied to the conduit line, and is ejected from the ejection ports 812 of the pipe 810 to the back side of the reflector, as air for cooling. In addition, since the flow rate of air supplied from the accumulator 820 to the pilot-operated valve 870 is controlled by the second flow rate control valve 890, the pilot-operated valve 870 can be kept open for a predetermined time, and the cooling on the reflector in the heater box 800 can be performed for a predetermined time in the event of a power failure.

Since the blower does not function in the event of a power failure, the ambient temperature in the heater box 800 rises significantly due to residual heat of the reflector. If the preform is abnormally heated by the high-temperature atmosphere, the preform may collapse or melt to come into contact with the quartz heater, resulting in damage to the heating device or fire. The cooling mechanism described above can suppress the malfunctions by automatically cooling the reflector with air in the event of a power failure. In addition, since the supply of air from the accumulator 820 is stopped and the pilot-operated valve 870 is automatically closed after a predetermined time elapses, the supply of air for cooling from the second air pressure source 840 is also stopped automatically. Thereby, the compressed air stored in the second air pressure source 840 composed of, for example, a compressor or the like is not necessarily used up in the event of a power failure, and the remaining compressed air can be efficiently used at the time of start. Further, since each valve on the conduit line can be switched without electric power, an expensive uninterruptible power supply (UPS) is not also required.

Note that, the present invention is not limited to the above embodiment and can be freely modified and improved as appropriate. In addition, the material, shape, dimension, numerical value, form, number, arrangement location, and the like of each constitutional element in the above embodiment are arbitrary and are not particularly limited as long as the present invention can be achieved.

For example, in the embodiment described above, the aspect in which various functional units are implemented in the processor of one device has been described. However, various functional units may be distributed and implemented in processors of a plurality of devices via a local network or the Internet. In addition, in the embodiment described above, the display unit 710 and the input unit 720 have been described as separate aspects, but may be configured as one functional unit by a touch panel or the like with which an input and a display can be made.

The present application is based on the Japanese Patent Application (Patent Application No. 2020-123156) filed on Jul. 17, 2020, and the Japanese Patent Application (Patent Application No. 2020-147627) filed on Sep. 2, 2020, the entirety of which is incorporated by reference. Also, all references cited herein are incorporated in their entirety.

REFERENCE SIGNS LIST

1: blow molding apparatus, 10: preform, 20: container, 100: injection molding part, 200: first reversing part, 300: conveyance part, 310: first conveyance member, 360: heating unit, 400: second reversing part, 500: blow molding part, 600: control device, 612: target value acquisition unit, 614: actual measured value acquisition unit, 616: calculation unit, 618: adjustment unit, 620: cycle time control unit, 700: input/output device

The invention claimed is:

1. A manufacturing apparatus of a resin container, comprising:

an injection molding part configured to injection-mold a bottomed resin preform;

a heating unit comprising a heating device configured to heat the preform to an optimum temperature for blow molding;

a blow molding part configured to manufacture a resin container by blow-molding the preform heated in the heating unit; and a control device of the manufacturing apparatus; and an input unit configured to accept input, by an operator, of a plurality of temperature differences between the target value and the actual measured value and setting values for degrees of adjustment of a heating performance and a cooling performance of the heating device corresponding to each of the plurality of temperature differences, wherein the setting values are input as rates of change for the adjustment of the heating performance and the cooling performance of the heating device, wherein the control device is configured to adjust the heating performance and the cooling performance of the heating device by adjusting the heating performance and the cooling performance in accordance with a rate of change for adjustment of the heating performance and the cooling performance of the heating device, and wherein the rate of change is set for the temperature difference corresponding to calculated temperature difference between the target value and the actual value among the plurality of temperature differences.

2. The manufacturing apparatus of the resin container according to claim 1, comprising a display unit configured to be able to display the target value and the actual measured value.

* * * * *